US012634677B1

(12) United States Patent
Ress

(10) Patent No.: US 12,634,677 B1
(45) Date of Patent: May 19, 2026

(54) METHODS AND SYSTEMS FOR PROVIDING ACTUAL NUMBER ACTIVATION STATUS

(71) Applicant: Bandwidth Inc., Raleigh, NC (US)

(72) Inventor: David Ress, Cary, NC (US)

(73) Assignee: Bandwidth Inc., Raleigh, NC (US)

( * ) Notice: Subject to any disclaimer, the term of this patent is extended or adjusted under 35 U.S.C. 154(b) by 0 days.

(21) Appl. No.: 19/421,584

(22) Filed: Dec. 16, 2025

(51) Int. Cl.
*H04B 1/38* (2015.01)
*H04W 8/20* (2009.01)
(52) U.S. Cl.
CPC .................................... *H04W 8/20* (2013.01)
(58) Field of Classification Search
CPC ...................................................... H04W 8/20
See application file for complete search history.

(56) References Cited

U.S. PATENT DOCUMENTS

2012/0163225 A1* 6/2012 Mishkin ............ H04M 15/8292
370/252
2018/0131667 A1* 5/2018 Jain ....................... H04M 3/436

* cited by examiner

*Primary Examiner* — Shantell L Heiber
(74) *Attorney, Agent, or Firm* — Gregory Stephens

(57) ABSTRACT

Methods for providing actual telephone number activation status are provided. The methods include collecting information associated with telephone numbers (TNs), the information including carrier information, deactivation information and disconnection information associated with each of the TNs; analyzing the carrier information, deactivation information and disconnection information for each TN over a predetermined period of time; and determining an actual status for each TN based on the analyzed carrier information, deactivation information and disconnection information. Related systems are provided.

20 Claims, 9 Drawing Sheets

TABLE 4

| | CARRIER INTEL | | | DEACT INTEL | | | | DISCONNECT INTEL | |
|---|---|---|---|---|---|---|---|---|---|
| TN | VOICE_PROVIDER | MESSAGE_PROVIDER | LINETYPE | DEACT_REPORTER | DEACT_DATE | DEACT_EVENT | CURRENTSTATE | INITIAL DATE_VERIFIED | MOST RECENT DATE_VERIFIED |
| 810820**** | COMPANY 1 | COMPANY 1 | WIRELESS | COMPANY 1 | 2024-11-06-16:54 | SUSPEND | ACTIVE | 11/19/2024 | 1/5/2025 |
| 650302**** | COMPANY 2 | COMPANY 2 | WIRELESS | | | | ACTIVE | 11/20/2024 | 1/10/2025 |
| 919462**** | COMPANY 3 | NONE | RBOC/FIXED | | | | UNKNOWN | | |
| 864565**** | COMPANY 2 | COMPANY 2 | WIRELESS | COMPANY 1 | 2024-11-06-16:54 | DEACTIVATE | ACTIVE | 11/20/2024 | 2/1/2025 |
| 484941**** | COMPANY 2 | COMPANY 2 | WIRELESS | COMPANY 1 | 2024-11-06-16:54 | DEACTIVATE | UNKNOWN | | |
| 919247**** | COMPANY 2 | COMPANY 2 | WIRELESS | | | | ACTIVE | 11/6/2024 | 1/15/2025 |
| 971378**** | COMPANY 1 | COMPANY 1 | WIRELESS | COMPANY 1 | 2024-11-06-16:53 | REACTIVATE | ACTIVE | 11/11/2024 | 1/5/2025 |
| 828838**** | COMPANY 1 | COMPANY 4 | VOIP | | | | ACTIVE | 11/8/2024 | 1/7/2025 |
| 667481**** | COMPANY 2 | COMPANY 2 | WIRELESS | COMPANY 2 | 2024-11-08-02:20 | DEACTIVATE | UNKNOWN | | |
| 559580**** | COMPANY 3 | COMPANY 3 | WIRELESS | COMPANY 3 | 2024-11-07-11:20 | DEACTIVATE | DISCONNECTED | 11/7/2024 | 1/10/2025 |
| 203360**** | COMPANY 3 | COMPANY 4 | VOIP | | | | UNKNOWN | | |
| 541861**** | COMPANY 1 | COMPANY 1 | WIRELESS | COMPANY 1 | 2024-11-06-16:53 | REACTIVATE | UNKNOWN | | |
| 210825**** | COMPANY 2 | COMPANY 2 | WIRELESS | COMPANY 3 | 2024-11-07-11:20 | PORT | DISCONNECTED | 11/5/2024 | 1/1/2025 |
| 240413**** | COMPANY 1 | COMPANY 1 | WIRELESS | | | | ACTIVE | 11/18/2024 | 1/7/2025 |

TABLE 1

| CARRIER INTELLIGENCE | |
|---|---|
| VOICE PROVIDER | NORMALIZED NAME OF THE PROVIDER RESPONSIBLE FOR VOICE SERVICE. THIS IS THE UNDERLYING OWNER OF THE TN AS FAR AS OVERALL PORTING IS CONCERNED |
| MESSAGE PROVIDER | NORMALIZED NAME OF THE PROVIDER RESPONSIBLE FOR MESSAGING. THIS IS USUALLY THE SAME AS THE VOICE PROVIDER, PARTICULARLY FOR MOBILE NUMBERS BUT CAN DEVIATE WHEN THE NUMBER IS NOT ASSIGNED TO MOBILE OPERATOR. THIS VALUE CAN BE NULL AS WELL INDICATING THE TN DOES NOT SUPPORT MESSAGING |
| LINE TYPE | FORMALIZED DESCRIPTION OF THE TYPE OF SERVICE ASSOCIATED WITH THE NUMBER: MOBILE, VOIP, FIXED, FIXED VOIP |
| CITY, STATE, COUNTRY | CITY, STATE AND COUNTRY THAT THE NUMBER BLOCK WAS ORIGINALLY ASSIGNED TO. DOES NOT NECESSARILY REFLECT WHERE THE SUBSCRIBER IS CURRENTLY LOCATED. |

*FIG. 5*

TABLE 2

| | CARRIER INTEL | | |
|---|---|---|---|
| TN | VOICE_PROVIDER | MESSAGE_PROVIDER | LINETYPE |
| 810820**** | COMPANY 1 | COMPANY 1 | WIRELESS |
| 650302**** | COMPANY 2 | COMPANY 2 | WIRELESS |
| 919462**** | COMPANY 3 | NONE | RBOC/FIXED |
| 864565**** | COMPANY 2 | COMPANY 2 | WIRELESS |
| 484941**** | COMPANY 2 | COMPANY 2 | WIRELESS |
| 919247**** | COMPANY 2 | COMPANY 2 | WIRELESS |
| 971378**** | COMPANY 1 | COMPANY 1 | WIRELESS |
| 828838**** | COMPANY 1 | COMPANY 4 | VOIP |
| 667481**** | COMPANY 2 | COMPANY 2 | WIRELESS |
| 559580**** | COMPANY 3 | COMPANY 3 | WIRELESS |
| 203360**** | COMPANY 3 | COMPANY 4 | VOIP |
| 541861**** | COMPANY 1 | COMPANY 1 | WIRELESS |
| 210825**** | COMPANY 2 | COMPANY 2 | WIRELESS |
| 240413**** | COMPANY 1 | COMPANY 1 | WIRELESS |

*FIG. 6*

TABLE 3

| DISCONNECT INTELLIGENCE | |
|---|---|
| CURRENT STATE | MEANING |
| ACTIVE | THE DATE VERIFIED INDICATES THE DATE OF THE MOST RECENT SUCCESSFUL DELIVERY TO THAT NUMBER |
| DISCONNECTED | THE DATE VERIFIED INDICATES THE DATE MESSAGES TO THIS NUMBER FAILING WERE FIRST OBSERVED AS FAILING |
| UNKNOWN | THERE IS NO RECENT HISTORY OF MESSAGES TO THIS NUMBER FROM WHICH TO DERIVE A STATE |

FIG. 7

TABLE 4

| TN | CARRIER INTEL | | | DEACT INTEL | | | DISCONNECT INTEL | | |
|---|---|---|---|---|---|---|---|---|---|
| | VOICE_PROVIDER | MESSAGE_PROVIDER | LINETYPE | DEACT_REPORTER | DEACT_DATE | DEACT_EVENT | CURRENTSTATE | INITIAL DATE_VERIFIED | MOST RECENT DATE_VERIFIED |
| 810820***** | COMPANY 1 | COMPANY 1 | WIRELESS | COMPANY 1 | 2024-11-06-16:54 | SUSPEND | ACTIVE | 11/19/2024 | 1/5/2025 |
| 650302***** | COMPANY 2 | COMPANY 2 | WIRELESS | | | | ACTIVE | 11/20/2024 | 1/10/2025 |
| 919462***** | COMPANY 3 | NONE | RBOC/FIXED | | | | UNKNOWN | | |
| 864565**** | COMPANY 2 | COMPANY 2 | WIRELESS | COMPANY 1 | 2024-11-06-16:54 | DEACTIVATE | ACTIVE | 11/20/2024 | 2/1/2025 |
| 48494l**** | COMPANY 2 | COMPANY 2 | WIRELESS | COMPANY 1 | 2024-11-06-16:54 | DEACTIVATE | UNKNOWN | | |
| 919247***** | COMPANY 2 | COMPANY 2 | WIRELESS | | | | ACTIVE | 11/6/2024 | 1/15/2025 |
| 971378***** | COMPANY 1 | COMPANY 1 | WIRELESS | COMPANY 1 | 2024-11-06-16:53 | REACTIVATE | ACTIVE | 11/11/2024 | 1/5/2025 |
| 828838**** | COMPANY 1 | COMPANY 4 | VOIP | | | | ACTIVE | 11/8/2024 | 1/7/2025 |
| 66748l**** | COMPANY 2 | COMPANY 2 | WIRELESS | COMPANY 2 | 2024-11-08-02:20 | DEACTIVATE | UNKNOWN | | |
| 559580***** | COMPANY 3 | COMPANY 3 | WIRELESS | COMPANY 3 | 2024-11-07-11:20 | DEACTIVATE | DISCONNECTED | 11/7/2024 | 1/10/2025 |
| 203360**** | COMPANY 3 | COMPANY 4 | VOIP | | | | UNKNOWN | | |
| 54186l***** | COMPANY 1 | COMPANY 1 | WIRELESS | COMPANY 1 | 2024-11-06-16:53 | REACTIVATE | UNKNOWN | | |
| 210825***** | COMPANY 2 | COMPANY 2 | WIRELESS | COMPANY 3 | 2024-11-07-11:20 | PORT | DISCONNECTED | 11/5/2024 | 1/1/2025 |
| 240413***** | COMPANY 1 | COMPANY 1 | WIRELESS | | | | ACTIVE | 11/18/2024 | 1/7/2025 |

FIG. 8

TABLE 5

| DEACTDB | | | | |
|---|---|---|---|---|
| REPORTER | TN | INITIAL DATE_VERIFIED | MOST RECENT DATE_VERIFIED | DEVENT |
| COMPANY 1 | 919555**** | 11/26/2024 11:30 | 1/5/2025 12:20 | DEACTIVATE |
| COMPANY 2 | 919555**** | 11/27/2024 11:20 | 11/5/2025 7:00 | DEACTIVATE |
| COMPANY 3 | 919555**** | 11/26/2024 16:54 | 1/20/2025 17:20 | DEACTIVATE |
| COMPANY 3 | 202555**** | 11/26/2024 16:54 | 1/15/2025 18:20 | DEACTIVATE |
| COMPANY 3 | 905555**** | 11/26/2024 16:54 | 1/6/2025 15:20 | SUSPEND |

*FIG. 9*

START

COLLECT INFORMATION ASSOCIATED WITH TNs
INCLUDING CARRIER INFORMATION, DEACTIVATION
INFORMATION AND DISCONNECTION INFORMATION
1000

ANALYZE THE CARRIER INFORMATION, DEACTIVATION
INFORMATION AND DISCONNECTION INFORMATION FOR
EACH TN OVER A PREDETERMINED PERIOD OF TIME
1010

DETERMINE AN ACTUAL STATUS FOR EACH TN
BASED ON THE ANALYZED INFORMATION
1020

END

| TN | CURRENT STATE | DATEVERIFIED |
|---|---|---|
| NPANXXXXXX | ACTIVE, DISCONNECT | DATE |

METHODS AND SYSTEMS FOR PROVIDING ACTUAL NUMBER ACTIVATION STATUS

FIELD

The present inventive concept generally relates to determining activation status of phone numbers and, more particularly, to providing actual activation status of telephone numbers by analyzing deactivation and activation of the same.

BACKGROUND

Details with respect to mobile numbers (number intelligence) are used by service providers and their customers to make sure message distribution lists are accurate and up to date. These details, such as activation status, must be accurate or a mobile user may receive unwanted messages or not receive necessary messages. Enhanced distribution list accuracy enables senders to eliminate sending messages to invalid (deactivated) numbers. Either way, the mobile user will not be satisfied. Improved methods of providing accurate details associated with mobile number are desired.

SUMMARY

Some embodiments of the present inventive concept provide methods for providing actual telephone number activation status. The methods include collecting information associated with telephone numbers (TNs) at an application programming interface (API), the information including carrier information, deactivation information and disconnection information associated with each of the TNs; analyzing, at a number intelligence module, the carrier information, deactivation information and disconnection information for each TN over a predetermined period of time; and determining, at the number intelligence module, an actual status for each TN based on the analyzed carrier information, deactivation information and disconnection information.

Related systems are provided.

BRIEF DESCRIPTION OF THE DRAWINGS

FIG. 5 is a table illustrating carrier intelligence in accordance with some embodiments of the present inventive concept.

FIG. 6 is a table illustrating example carrier intelligence in accordance with some embodiments of the present inventive concept.

FIG. 7 is a table illustrating disconnect intelligence in accordance with some embodiments of the present inventive concept.

FIG. 8 is a table illustrating carrier intelligence, deactivation intelligence and disconnect intelligence in accordance with some embodiments of the present inventive concept.

FIG. 9 is a table illustrating a deactivation table (DEACTDB) in accordance with some embodiments of the present inventive concept.

DETAILED DESCRIPTION OF EMBODIMENTS

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

Figure 1:
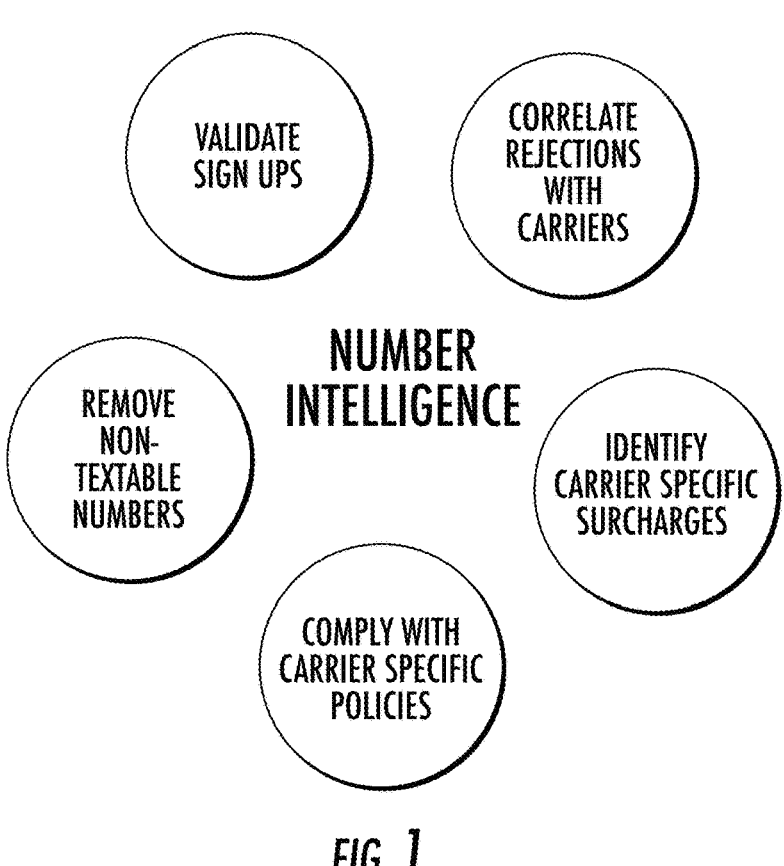
FIG. 1 is a diagram illustrating use of number intelligence in accordance with some embodiments of the present inventive concept.

Number intelligence is an important aspect of managing messaging, especially, messaging campaigns. This intelligence may be used to improve and monitor many aspects of wireless communications. As illustrated in FIG. 1, for messaging distribution campaigns, number intelligence may be used to, for example, validate sign ups; remove non-textable numbers; remove numbers that have been disconnected; identify carrier specific surcharges to predict messaging costs; correlate rejections with specific carriers and the like. Specifically, to validate signups, messaging campaign customers obtain new mobile user numbers in a variety of ways and when these new mobile user numbers are obtained, information about these numbers are gathered before the number is added to the campaign distributions. If messaging campaign customers send advertisements, reminders, offers and the like to a number that does not want to receive their information, this is a violation of set guidelines and may result in penalties being assessed. Similarly, it is important to ensure that everyone that is supposed to receive these messages is receiving them.

Mobile network operators (MNOs) also expect Direct Connect Aggregators (DCAs) to present clean, quality traffic. A DCA is a company that has a direct, established connection to mobile carriers, which allows the DCA to transmit, for example, short messaging service (SMS) and multimedia messaging service (MMS) messages, for its customers. These aggregators may act as a bridge between businesses and MNOs, such as AT&T®, Verizon® and T-Mobile®, and are generally responsible for both message delivery and ensuring that campaigns comply with carrier regulations. Bandwidth Inc. may be considered a DCA in some embodiments.

Beyond SPAM being undesired traffic, there are other metrics MNOs look to determine if the traffic is "clean", including the presentation of messages to invalid destination numbers. To this end, MNOs, such as AT&T®, Verizon®, T-Mobile® and the like, generally require their DCA partners to process their deactivation lists. In addition to ceasing delivery of traffic to invalid destinations, the expectation is that handling deactivations ensures that customers of the DCA are aware of cases when a mobile user "opt in" is no longer valid due to, for example, a number disconnect and eventually reassignment. An "opt in" refers to when a mobile user associated with a corresponding mobile number elects to receive messages from a certain entity, for example, messaging campaigns, doctors' offices, banks etc. Similarly, an "opt out" is when the mobile user associated with the mobile number no longer wants to receive messages from the entity. The complication arises when the mobile number is no longer associated with the mobile user and gets deactivated, this number needs to be identified and no longer be included as an "opt in."

Figure 2:
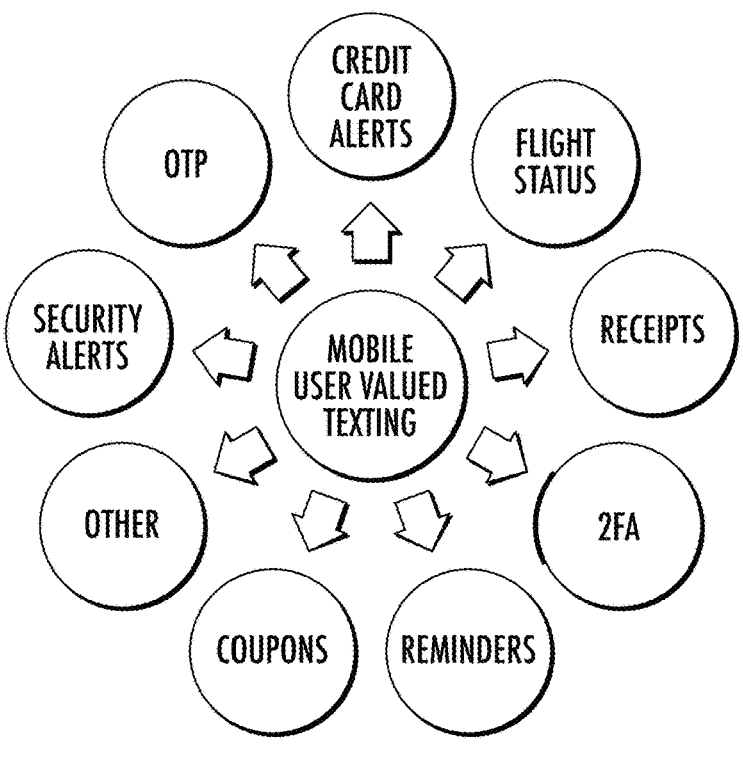
FIG. 2 is a block diagram illustrating mobile user expectations in accordance with some embodiments of the present inventive concept.

Ideally, the requirements set are not just met but exceeded. Merely complying with requirements may lead to a poor experience for business customers and just as importantly, a poor mobile user experience. Mobile users value and are dependent upon text messaging campaign subscriptions of which they may have dozens. Various types of text messaging campaign subscriptions are illustrated in FIG. 2, for example, credit card alerts, flight status, receipts, two factor authentication (2FA), reminders, coupons, security alerts, one-time password (OTP) and the like. A mobile user expects all messaging campaigns to remain active when their number is ported from one MNO to another. Furthermore, if service is temporarily suspended, a mobile user expects all messaging campaigns to remain active once service resumes.

Number intelligence in accordance with embodiments discussed herein includes multiple layers, for example, carrier intelligence, deactivation intelligence and disconnect intelligence. Carrier intelligence provides the static mapping of a telephone number to one or more providers. For mobile numbers, this is usually a single carrier that provides both voice and messaging service. For voice over internet protocol (VOIP) numbers, different messaging and voice providers may be used. This basic number intelligence is gathered from industry data sources including, for example, the Local Exchange Routing Guide (LERG), number Portability Administration Center (NPAC), NetNumber Global Carrier Mapping Registry (GCMR) and the NetNumber Service Registry (NNSR).

Dynamic events change the state and/or assignment of a number and include, for example, porting of numbers, suspensions of numbers (temporary) and disconnects of numbers (permanent). This can affect most of the key use cases customers have for procuring number intelligence on their campaign targets.

Carrier deactivation files generally contain a list of telephone numbers and the date upon which one of these dynamic events occurred that change the number. Unfortunately, the deactivation files generally do not indicate the event that occurred to place the number on the deactivation list. Furthermore, many—nearly two thirds in some case studies—of the phone numbers appearing on a deactivation list are not actually removed from service in such a way that messages should no longer be delivered. In one case study about a third of these deactivations were found to be "ports," where a mobile subscriber moves from one MNO to another, for example, AT&T® to Verizon®. Ported numbers remain able to receive texts and the mobile user has no expectation that porting would result in loss of all text campaign subscriptions.

Of the remaining deactivations found in the deactivation list, a large amount are temporary suspensions, which are often quickly resolved. Again, the mobile user has a reasonable expectation that temporary suspension did not unsubscribe them from any text campaigns. For example, a customer's service may be suspended for non-payment, which is most common with prepaid phones. Once payment is received, a customer has a reasonable expectation that service to their phone will continue without cancelling the text campaigns they subscribed to.

Cross referencing the contents of carrier deactivation files with carrier intelligence information provides actionable intelligence on a number enabling providers and their customers to recognize a number reassignment without removing it from a campaign. Monitoring messaging delivery for error codes that indicate that a telephone number is disconnected (and for how long) provides actionable intelligence on a number enabling campaign customers to recognize the disconnect and remove it from their campaign distribution.

Thus, providing information to customers running a campaign or campaigns about the capabilities and state of the Telephone Numbers (TNs) they target with their messaging campaigns is increasingly valuable.

Using number intelligence to upgrade service as discussed herein allows campaign service providers to aid customers in optimizing message delivery performance and ensure that they are not violating any stated guidelines. Embodiments of the present inventive concept utilizing number intelligence to provide better service to both business campaign customers as well as mobile customers will be discussed below with respect to the figures.

Figure 3A:
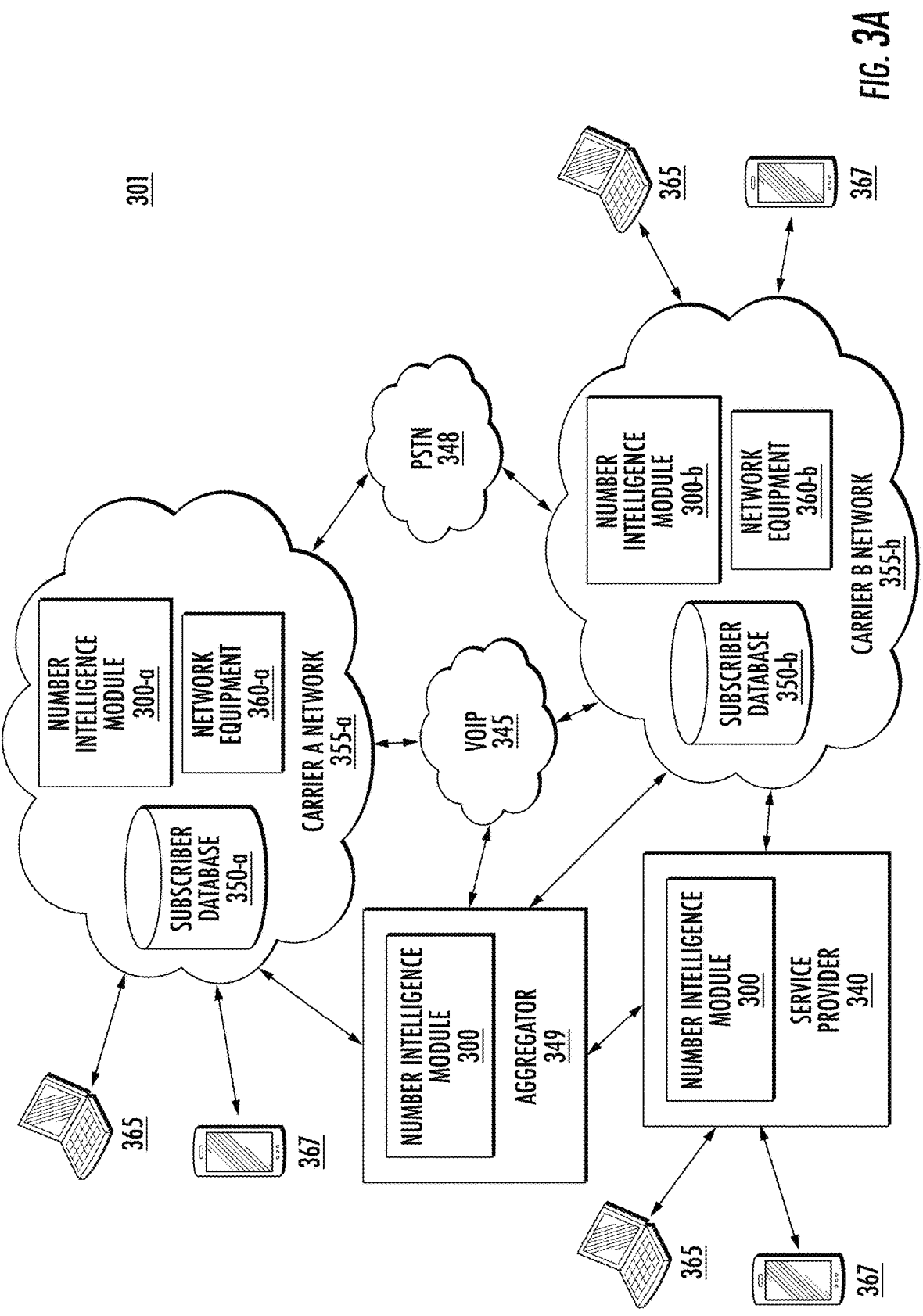
FIG. 3A is a block diagram illustrating a system including a number intelligence module in accordance with some embodiments of the present inventive concept.

Referring first to FIG. 3A, a block diagram illustrating an example system 301 in which embodiments of the present inventive concept may operate will be discussed. As illustrated, the system 301 includes a voice over internet protocol (VOIP) network 345; a public switched telephone network (PSTN) 348; a plurality of Carrier networks, for example, Carrier A Network 155-*a* and Carrier B Network 155-*b*; an aggregator 349; a service provider 340 and a plurality of endpoints 365 and 367 in communication with the Carrier Networks 355-*a* and 355-*b*, the aggregator 349 and the service provider 340. Although only two Carriers, one service provider and one aggregator are illustrated in FIG. 3A, it will be understood that one Carrier or more than two Carriers and more than one service provider or aggregator may be present in the system without departing from the scope of the present inventive concept.

The VoIP network 345 is provided by a group of technologies and is a method for the delivery of voice communications and multimedia sessions over Internet Protocol (IP) networks, such as the Internet. The terms Internet telephony, broadband telephony, and broadband phone service specifically refer to the provisioning of communications services (voice, facsimile, short message service (SMS), voice-messaging and the like) over the Internet, rather than via the PSTN. The PSTN network 348 is an aggregate of the world's circuit-switched telephone networks that are operated by national, regional, or local telephony operators, providing infrastructure and services for public telecommunication. The network 345 may be any combination of wired and/or wireless networks, including without limitation a direct interconnection, secured custom connection, private network (e.g., an enterprise intranet), public network (e.g., the Internet), personal area network (PAN), local area network (LAN), metropolitan area network (MAN), operating missions as nodes on the Internet (OMNI), wireless area network (WAN), wireless network (e.g., 802.11 WiFi), cellular network, and other communications networks.

The plurality of endpoints may include an internet of things (IoT) endpoint 365 and/or a telephony endpoint 367. The IoT endpoint may include an end user device such as a personal computer (PC), security system or component, heating, ventilation, and air conditioning (HVAC) system or component, automotive device, audio device, smart refrigerator, smart stove, smart television, and the like. The telephony endpoint 367 may be a mobile device such as cell phone, smartphone, laptop, VOIP phone, IoT device, or another telephonic device. The endpoints 365 and 367 communicate through the networks 345 and 348 and the Carriers 355-*a* and 355-*b*.

As used herein, the term a "telecommunications Carrier" may refer to any provider of telecommunications services. FIG. 3A also includes a service provider 340 and an aggregator 349. It will be understood that a Carrier, such as Carrier A and B in FIG. 3A may be a service provider, for example, Verizon®, AT&T® and the like. However, the reverse is not true, a service provider 340 is not necessarily a Carrier. In embodiments where the service provider 340 is not a Carrier, the service provider 340 may be a customer of the Carrier. FIG. 3A illustrates, the service provider 340 being a customer of Carrier B 355-*b*. It will be understood that although the service provider 340 is shown as only being a customer of Carrier B 355-*b*, embodiments of the present inventive concept are not limited thereto. The service provider 340 may be customer of other Carriers or there may be additional service providers in the system 301 without departing from the scope of the present inventive concept. The aggregator 349 is an intermediary that provides a single point of contact for managing and reselling services from, for example, multiple providers. These services can include, for example, voice, data, and wireless, offering benefits like cost savings through bulk purchasing, simplified billing, and a unified management platform. It will be understood that the aggregator 149 may be combined with other elements of the system 301, for example, the service provider 340, without departing from the scope of the present inventive concept.

As further illustrated in FIG. 3A, each Carrier Network 355-*a* and 355-*b* may include subscriber databases 350-*a* and 350-*b*; network equipment 360-*a* and 360-*b* and a number intelligence module 300-*a* and 300-*b*, respectively, in accordance with embodiments discussed herein. It will be understood that these modules may also be present in other elements of the system 301. For example, these elements may be present at a direct Carrier aggregator (DCA) 349 a campaign service provider (CSP) and the like without departing from the scope of the present inventive concept. A number intelligence module 300 in accordance with some embodiments discussed herein is shown as being included in the DCA 349 in FIG. 3A. The network equipment 360-*a* and 360-*b* may illustrate any hardware used to send, receive, and route messages at the Carrier Network 355-*a* and 355-*b*. For example, the subscriber database 350-*a* and 350-*b* may include a list of all customers that subscribe that have an active campaign in accordance with embodiments discussed herein.

Figure 3B:
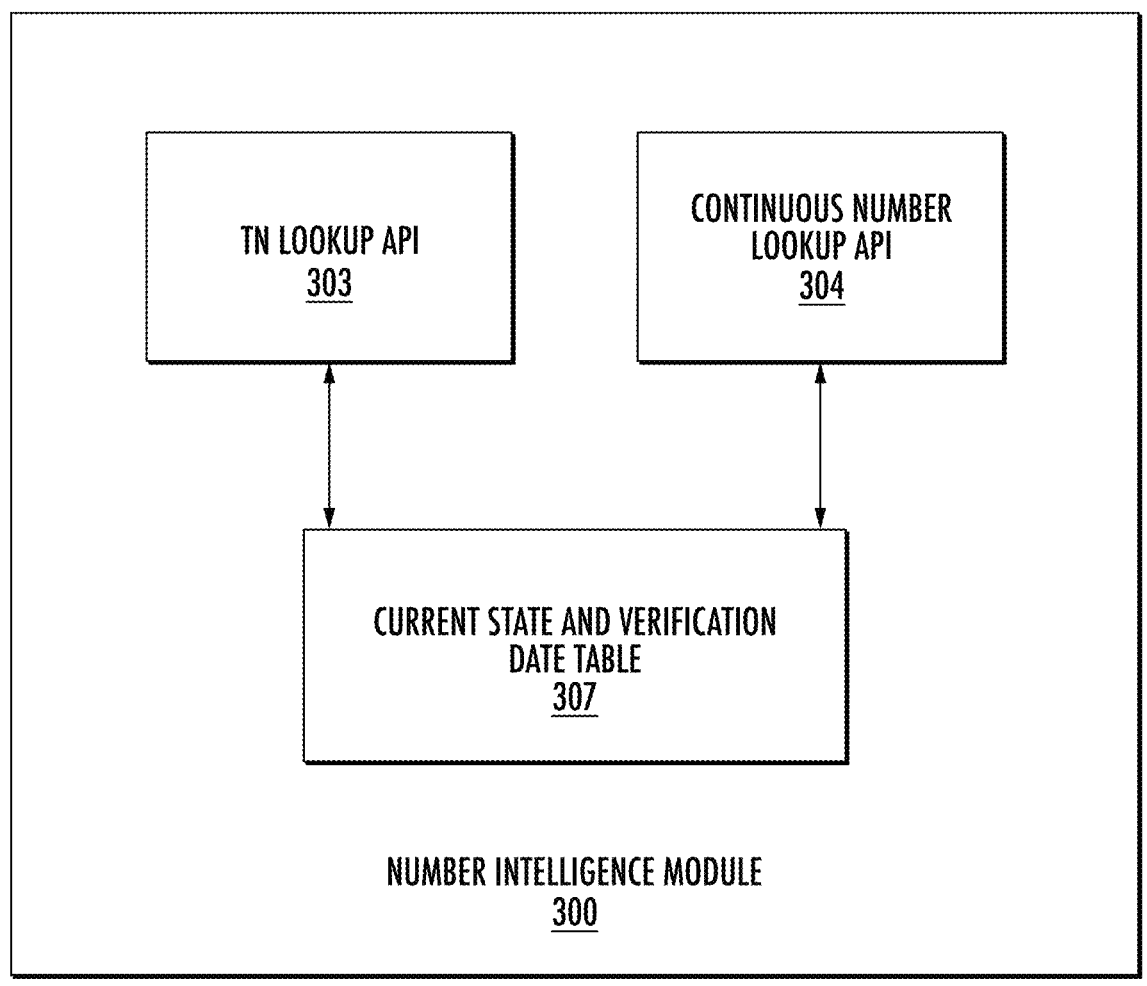
FIG. 3B is a detailed block diagram of the number intelligence module in accordance with some embodiments of the present inventive concept.

The number intelligence module 300-*a*, 300-*b* and 300 may provide methods, systems and computer program products for providing actual TN status in accordance with embodiments discussed herein. The intelligence modules 300-*a*, 300-*b* and 300 may be referred to collectively as "number intelligence module 300." As will be discussed further herein, the number intelligence module 300 gathers information related to the carriers of TNs, activation/deactivation of TNs, and disconnection of TNs and uses this information to determine the actual status of the TN. This actual status allows TNs to be added, removed or blocked from customer lists such that messages will be delivered accurately. As illustrated in FIG. 3B, in some embodiments, the number intelligence module 300 may include a TN Lookup service which may be implemented using an Application Programming interface (API) 303 and a continuous number lookup service which may be implemented using an API 304 that communicates with a table including all the gathered carrier, deactivation and disconnection intelligence. For example, this table may include a current status and verification date for all TNs. This information is processed and used to determine that actual status of all of the TNs in the database so that messages can be accurately sent to the proper destinations without disruption.

In particular, embodiments of the present inventive concept organize intelligence information and capabilities into units which can be delivered incrementally and consumed through, for example, multiple interfaces including a telephone number (TN) Lookup (TNL) 303 and Continuous Number Lookup (CNL) 304. Thus, a system of tools and services may be provided through which all use cases can be fulfilled, mobile user expectations can be met and a DCA's commitment to carriers can be honored.

Referring now to FIG. 3B, the number intelligence module 300 in accordance with some embodiments discussed herein includes two modules that may be provided for consuming number intelligence information, a TN lookup service/API 303 and a Continuous Number Lookup (CNL) service/API 304 (FIG. 3B). The TNL lookup service 303 gathers carrier, deactivation and disconnect intelligence about 1 or more numbers, whereas CNL gathers intelligence for a single number during an actual attempt to send a message. The CNL 303 may also support all three levels of intelligence, carrier, deactivation and disconnect. Some embodiments may only have TNL and not CNL and other embodiments will have both without departing from the scope of the present inventive concept.

Figure 4:
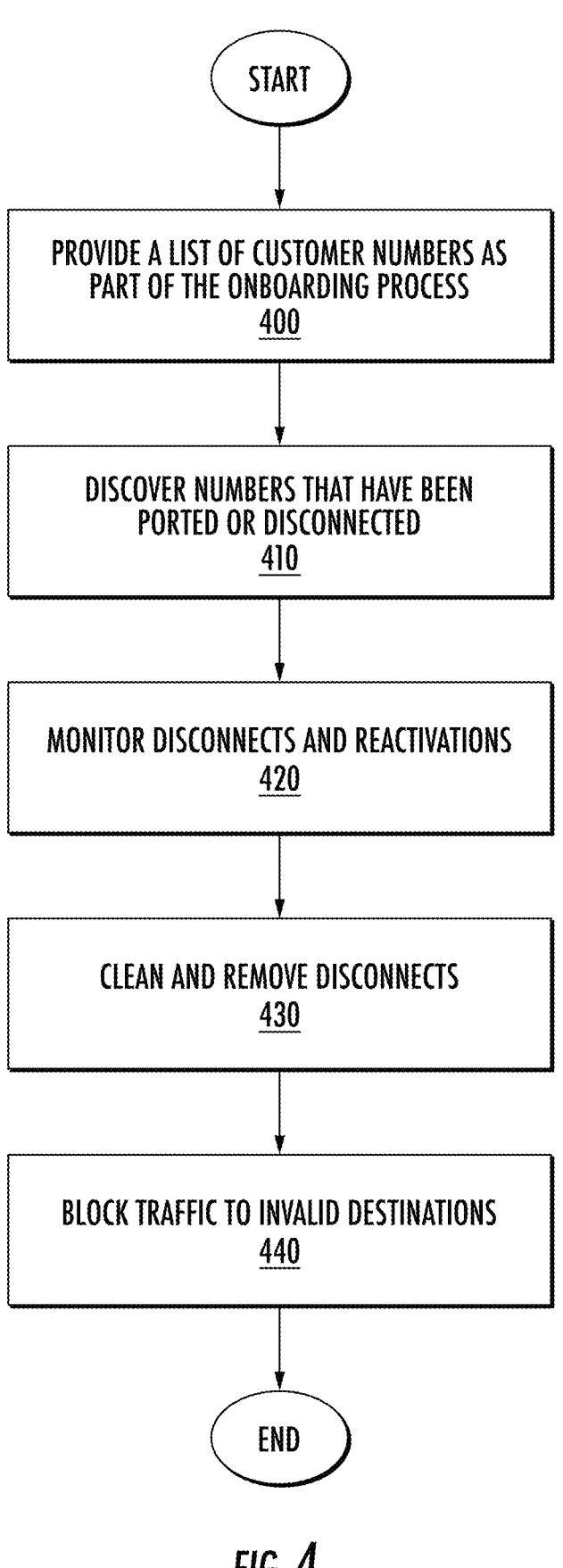
FIG. 4 is a high level flowchart illustrating operations involved in number intelligence in accordance with some embodiments of the present inventive concept.

Referring now to FIG. 4, embodiments where the TNL and CNL work together will be discussed. As illustrated in FIG. 4, operations begin at block 400 when a campaign provider onboards new mobile user numbers for use in a messaging campaign distribution. During this onboarding, the provider may use the TNL to filter the candidate lists of new numbers for campaigns removing those which are invalid. Once campaign messaging begins, the provider may use CNL (block 410) to discover if the number status has been dynamically altered such as being ported, disconnected and the like. The numbers discovered as invalid may be periodically monitored using TNL to determine when this correlates to a permanent disconnection as opposed to a temporary suspension (block 420). The numbers that have been permanently disconnected can be removed from the system (block 430). In some embodiments of the present inventive concept, a service provider/DCA may use information from the number intelligence to block traffic to invalid destinations, satisfying carrier requirements (block 430).

As discussed above, there are different types of intelligence within number intelligence services. For example, the types of intelligence may include carrier intelligence, deactivation intelligence and disconnect intelligence. It will be understood that these types of intelligence are provided as examples only and embodiments of the present inventive concept are not limited thereto. The information gathered for each type of intelligence can be stored and analyzed to help determine the actual status of a telephone number. Each type of intelligence will be discussed herein.

Carrier Intelligence is the basic intelligence derived from industry data sources including LERG, NPAC, Netnumber Global Carrier Mapping Registry (GCMR) and Netnumber Service Registry (NNSR). This information may be communicated through an API that is programmed to collect this data, for example, a number lookup API. Carrier intelligence data may include, for example, the data illustrated in Table 1 of FIG. 5. It will be understood that Table 1 is provided as an example only and embodiments of the present inventive concept are not limited thereto. For example, the data may include information related to the voice provider, the message provider (which may be the same), the line type and city, state and country.

The voice provider refers to a normalized name of the provider responsible for voice service. This is the underlying owner of the TN. The message provider refers to a normalized name of the provider responsible for messaging. This may be the same as the voice provider, particularly for mobile numbers but can deviate when the number is, for example, not assigned to a mobile operator. It may also deviate when an override has taken place and a different provider delivers the messaging service. This can even change what would have been a non-textable number (e.g. an RBOC/Fixed number) into a textable number (e.g. a VOIP number).

The message provider may have a NULL value as well indicating the TN does not support messaging. The line type refers to a normalized description of the type of service associated with the number, for example, mobile, VOIP, Fixed, Fixed VOIP and the like. As used herein, "normalized" refers to using a more generic name for providers or services, the generic name indicating one or more other providers or services. For example, Verizon is a normalized name that can be used for all the subcompanies that Verizon controls. Finally, city, state and country refer to the City, State and Country that the number block was originally assigned to. It will be understood that this does not necessarily reflect where the subscriber is currently located.

This carrier intelligence may be encoded in the TNLs and CNLs discussed above according to the standards used by those services, for example, JavaScript Object Notation (JSON). Table 2 of FIG. 6 provides a generalized example of the information returned from the information gathering API. Table 2 is provided as an example only. Note that the linetype RBOC may be normalized to Fixed in some embodiments, thus RBOC/Fixed is listed as alternatives in the tables discussed herein. Furthemore, in some embodiments, a voice provider (e.g. Company 1=wireless linetype) may be a default provider that may be overriden by Company 4, a VOIP provider (Linetype=VOIP). This is shown in Table 2 of FIG. 6. Thus, Company 4 has overriden the default message provider, Company 1, which might have been NONE otherwise Deactivation intelligence includes the information provided by carriers in their deactivation list such that it is actionable. Most, but not all, carrier deactivation lists simply include a TN entry with no explanation as to why the number is on the list. For example, the following information is provided: the carrier reporting the deactivation, the deactivation Date and sometimes the deactivation Event. Embodiments of the present inventive concept further provide information related to deactivation, suspension and reactivation. Deactivation indicates that the TN is no longer active on a carrier's network. Suspension (Suspend) describes a more specific state of a deactivation indicating that the TN is temporarily disconnected. This may be due, for example, to non-payment. Reactivate indicates that a TN has been reactivated, possibly from a temporary deactivation.

Finally, disconnect intelligence observes delivery success and specific types of delivery failures of messages to mobile TNs to provide intelligence that may enable determination of whether a number is known to be active or disconnected and how long it has been disconnected by verification date. In some embodiments, both the initial date the disconnection was observed and the most recent date it was verified are used. This is reflected in Tables 4 and 5 (FIGS. 8 and 9, respectively). Examples of the current state and definitions of these states of disconnect intelligence are illustrated in Table 3 of FIG. 7. As illustrated therein, the states include active, disconnected and unknown. In particular, the Active state refers to the date of the most recent successful delivery to that number. Disconnected indicates the date messages to this number where first observed as failing. Unknown indicates that there is no recent history of messages to this number from which to derive a state. The date verified is used to determine how long a TN has been in a particular disconnect state to make an informed decision as to whether to remove the number from distribution. As discussed above, in some embodiments, both the initial date verified and most recent date verified are provided, which makes it a little easier to determine how long a number has been deactivated.

Table 4 of FIG. 8 provides an example of the carrier intelligence, deactivation intelligence and disconnect intelligence as discussed herein for each TN. Examples of using number intelligence, i.e. all three types of number intelligence, illustrated in FIG. 8 in accordance with some embodiments of the present inventive concept will now be discussed. For example, for TN 8108201*, this number was reported as Suspended by its carrier (COMPANY 1) on 11/6, however a successful message was sent to this number on Nov. 19, 2024 and verified again on Jan. 15, 2025. Thus, without using the disconnect intelligence, message to this number may stop. For TN 8645652*, this number was reported by COMPANY 1 as deactivated, but it is confirmed as active on COMPANY2. Thus, it may be concluded that this number was ported from COMPANY 1 to the COMPANY 2T-Mobile. For TN 4849411*, this number was reported by COMPANY 1 as deactivated, the number is still with COMPANY 2, but there is no recent messaging traffic by which to determine if the number is active or disconnected. Finally, for TN 2108251*, this number was reported by COMPANY 3 as deactivated and it is now associated with COMPANY 2 but is disconnected. This number was not likely ported. It is a "snap-back," which means it was disconnected from COMPANY 3, but since the number block belongs to T-Mobile, the number effectively belongs to them again. These examples clearly illustrate the importance of using all the number intelligence available so that the list of numbers for a campaign stay current and that an accurate status of the TN is maintained.

To summarize, number intelligence is a service using data from industry sources including LERG, NPAC and Net-Number. Deactivation Intelligence uses data from carrier supplied deactivation lists. Disconnect Intelligence consumes information from observing actual messaging attempts to derive a current state. A user of this intelligence may conclude that a number is permanently deactivated when it is observed to be in that state for a window of <N> days. The value of N may be chosen to align with a long enough evaluation period that permanent disconnects can be distinguished from temporary suspension. A value of N=45 would cover the aging period for disconnected numbers by US carriers for example.

As discussed above, number intelligence in accordance with embodiments discussed herein may include two modules that may be provided for consuming number intelligence information, a TN lookup service/API 303 and a CNL service/API 304. Some embodiments may only have TNL and not CNL and other embodiments will have both without departing from the scope of the present inventive concept.

While a TNL returns deactivation intelligence via API, it depends upon data describing the contents of the carrier deact (ivation) file being derived and stored where it can access it. Accordingly, some embodiments of the present inventive concept provide a deactivation and disconnect data table (307, FIG. 3B) that derives the current state and a verification date for every mobile TN that was reached on a network over a period of time, for example, 365 days. An example table (DEACTDB) is provided, for example, in Table 5 of FIG. 9. However, embodiments of the present inventive concept are not limited thereto. As illustrated therein, Table 5 (DEACTDB) including the carrier's name reporting the information (Reporter), the TN, the date and time of the event and the event (deactivate, reactivate, suspend).

When collecting data, only messages that are either definitely successful or definitely disconnected are considered. Other types of failures which may be transitory are ignored. The state of the TNs may be ACTIVE (the most recent message attempt was successful) (or deactivated (the most recent message attempt failed). In addition to current state, each TN includes a verification date details. This includes the earliest date at which the current status was determined and the most recent date at which the current status was verified are included to enable quick identification of the historical status of the number. The data collected is easily accessible to the TN Lookup service for incorporation into TNL as disconnect intelligence.

A campaign provider gains actionable intelligence from the TNL which can be used to withhold sending messages to an invalid number or potentially remove the number from distribution altogether.

In some embodiments of the present inventive concept, the DCA may use number intelligence to block messages to numbers which are invalid or reported as disconnected. When used in this manner, it is important to periodically test the current state of a TN identified previously as disconnected to ensure messages are not blocked when the number becomes active again. This can be achieved by, for example, the aggregator, allowing a message per <period> to be sent to the TN and then monitoring the success or failure of the attempt. If the message continues to be rejected due to the number being disconnected, the messages to that number are blocked for the remainder of the <period>. If the message is delivered successfully however, the number is removed from the block list. The <period> can be set to any reasonable amount of time. In some embodiments, the value of <period> may be a day. If the period is too short, then more invalid destination messages are sent. If the period is too long, then messages may be blocked to numbers which have become valid again. In some embodiments, a list of disconnected numbers is retained indefinitely.

Figure 10:
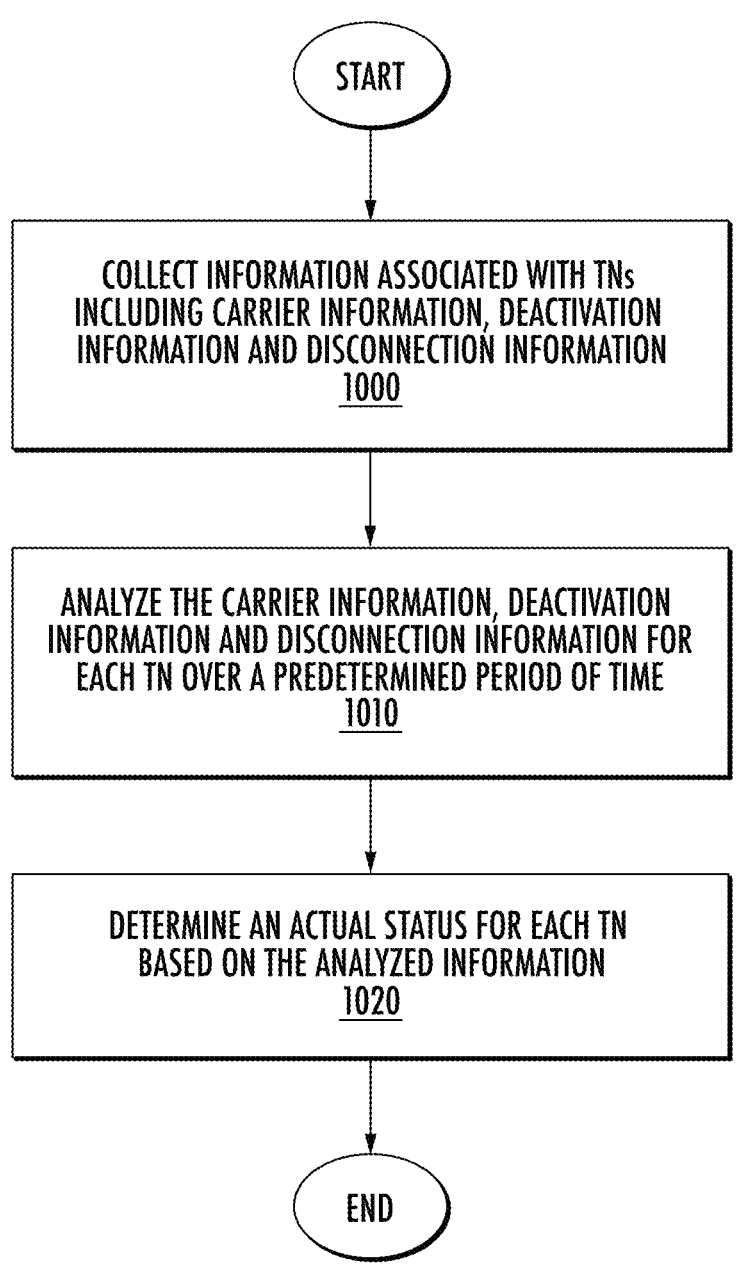
FIG. 10 is a flowchart illustrating operations for determine actual status of a telephone number in accordance with some embodiments of the present inventive concept.

Various embodiments of the present inventive concept may be combined or reconstructed to provide flexible features. Thus, users can pick and choose which aspects of the present inventive concept are included in various embodiments. Referring now to FIG. 10, operations for determining actual status of a telephone number in accordance with some embodiments of the present inventive concept will be discussed. As illustrated in FIG. 10, operations for providing actual telephone number activation status begin at block 1000 by collecting information associated with telephone numbers (TNs). As discussed herein, the intelligence information collected includes carrier information, deactivation information and disconnection information associated with each of the TNs. This carrier information, deactivation information and disconnection information is analyzed for each TN over a predetermined period of time (block 1010). An actual status for each TN based on the analyzed carrier information, deactivation information and disconnection information is determined (block 1020).

Figures 11, 12:
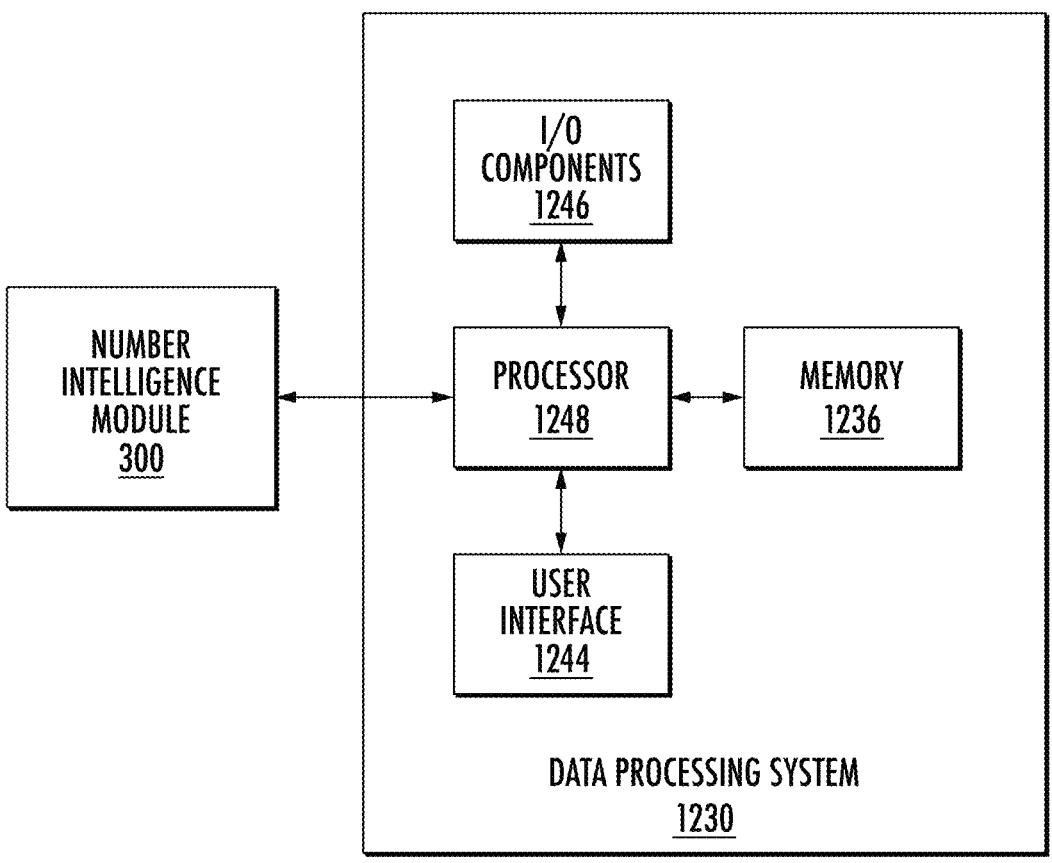
FIG. 11 is an example of disconnect information in accordance with some embodiments discussed herein.
FIG. 12 is a high-level block diagram of a data processing system for use with a number intelligence module in accordance with some embodiments of the present inventive concept.

The disconnection information may include at least a current state of activation and a date on which the current state of activation was verified, which is visually illustrated in FIG. 11. Determining the actual status for each TN includes performing a disconnect analysis for each TN over the period of time to provide the current state of activation and the date on which the current state of activation was verified.

In some embodiments, the disconnect analysis may include first deriving a current state of activation for each TN over a sliding window of N days, for example, 60 days.

It will be understood that embodiments of the present inventive concept are not limited to 60 days; any reasonable amount of time may be used without departing from the scope of the present inventive concept. The sliding window in accordance with embodiments discussed herein because it has been discovered that "temporary" disconnections happen frequently. Thus, if the status of a TN is only looked at in a particular moment in time, the TNs that have been temporarily disconnected will be improperly removed from campaigns causing customers to not receive important information. Thus, the current state of each TN is updated periodically, for example, every 24 hours.

In some embodiments, the current state of activation for each TN may include one of Active, Unknown and Disconnected. In some embodiments, an active states indicates the date of a most recent observed successful message. Similarly, a disconnected state is the date of an oldest observed invalid message. An example presentation of this data is illustrated in FIG. 11.

In some embodiments, the carrier information includes at least a voice provider, a message provider and a type of line associated with each of the TNs. The voice/message provider may be the mobile service provider, for example, Verizon, T-Mobile and the like. These can be the same or different without departing from the scope of the present inventive concept. The type of line may be, for example, wireless or Region Bell Operating Company (RBOC) or may be normalized to, for example, FIXED, VOIP, VOIP-FIXED, WIRELESS and the like. In some embodiments, the carrier information may be obtained from LERG, NPAC, GCMR and/or NNSR.

In some embodiments, the deactivation information may include at least an entity that reported that deactivation, a date on which deactivation occurred and a type of deactivation. The type of deactivation may include deactivation, reactivation and suspension in some embodiments. This information may be obtained from available deactivation files or may be derived by cross referencing the deactivation intel with the carrier and disconnect intel.

Referring now to FIG. 12, an example of a data processing system 1230 suitable for use with any of the examples described above will be discussed. Although the example data processing system 1230 is shown as in communication with the number intelligence module 300 in accordance with embodiments of the present inventive concept, the data processing system 1230 may also be part of any other component of the system without departing from the scope of the present inventive concept. In some examples, the data processing system 1230 can be any suitable computing device for performing operations according to the embodiments discussed herein described herein.

As illustrated, the data processing system 1230 includes a processor 1248 communicatively coupled to I/O components 1246, a user interface 1244 and a memory 1236. The processor 1248 can include one or more commercially available processors, embedded processors, secure processors, microprocessors, dual microprocessors, multi-core processors, other multi-processor architectures, another suitable processing device, or any combination of these. The memory 1236, which can be any suitable tangible (and non-transitory) computer-readable medium such as random access memory (RAM), read-only memory (ROM), erasable and electronically programmable read-only memory (EE-PROMs), or the like, embodies program components that configure operation of the data processing system 1230.

I/O components 1246 may be used to facilitate wired or wireless connections to devices such as one or more displays, game controllers, keyboards, mice, joysticks, cameras, buttons, speakers, microphones and/or other hardware used to input or output data. Memory 1236 represents nonvolatile storage such as magnetic, optical, or other storage media included in the data processing system and/or coupled to processor 1248.

The user interface 1244 may include, for example, a keyboard, keypad, touchpad, voice activation circuit, display or the like and the processor 1248 may execute program code or instructions stored in memory 1236.

It should be appreciated that data processing system 1230 may also include additional processors, additional storage, and a computer-readable medium (not shown). The processor(s) 1248 may execute additional computer-executable program instructions stored in memory 1236. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

As briefly discussed above, accuracy of telephone number activation/deactivation status is critically important. Conventional methods of providing status do not adequately adjust for telephone numbers that may toggle from active to inactive. Thus, embodiments of the present inventive concept provide methods and system for providing an actual deactivation status by using carrier intelligence, deactivation intelligence and disconnection intelligence. The use of all of this information provides a much more accurate status and allows customers to continue to receive their critical information.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon® Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random-access memory (SRAM), dynamic random-access memory (DRAM), or magnetic random-access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction. It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

That which is claimed is:

1. A method for providing actual telephone number activation status, the method comprising:
  collecting, at an application programming interface (API), information associated with telephone numbers (TNs), the information including carrier information, deactivation information and disconnection information associated with each of the TNs;
  analyzing, at an intelligent number module, the carrier information, deactivation information and disconnection information for each TN over a predetermined period of time, wherein the disconnection information comprises at least a current state of activation and a date on which the current state of activation was verified; and
  determining an actual status for each TN based on the analyzed carrier information, deactivation information and disconnection information at the intelligent number module, the determining comprising performing a disconnect analysis for each TN over the predetermined period of time to provide the current state of activation and the date on which the current state of activation was verified, and wherein the disconnect analysis comprises:
    deriving a current state of activation for each TN over a sliding window of N days, wherein deriving the current state of activation for each TN over the sliding window of N days comprises locating messages that were successfully delivered or failed, wherein a failed message is indicated by a TN being invalid over the sliding window of N days; and
    periodically updating the derived current state of each TN.

2. The method of claim 1, wherein periodically updating comprises updating the derived current state of each TN every 24 hours.

3. The method of claim 1, wherein the current state of activation for each TN comprises one of Active, Unknown and Disconnected.

4. The method of claim 3, wherein a date the current state is verified comprises a date of a most recent observed successful message for an active state and a date of an oldest observed invalid message for a disconnect state.

5. The method of claim 1, wherein the carrier information comprises at least a voice provider, a message provider and a type of line associated with each of the TNs.

6. The method of claim 5, wherein the voice provider is a normalized name of a provider responsible for voice service and wherein a message provider is a normalized name of a provider responsible for messaging.

7. The method of claim 6, further comprising obtaining the carrier information from at least one of a Local Exchange Routing Guide (LERG), Number Portability Administration Center (NPAC), NetNumber Global Carrier Mapping Registry (GCMR) and a NetNumber Service Registry (NNSR).

8. The method of claim 1, wherein the deactivation information includes at least an entity that reported that deactivation, a date on which deactivation occurred and a type of deactivation.

9. The method of claim 8, wherein the type of deactivation comprises one of port, deactivation, reactivation and suspension.

10. The method of claim 9, further comprising deriving a deactivation type by cross referencing information from carrier intelligence and available deactivation files.

11. A system for providing actual telephone number activation status, the system comprising a number intelligence module and at least one application programing interface that together:

collect information associated with telephone numbers (TNs), the information including carrier information, deactivation information and disconnection information associated with each of the TNs;

analyze the carrier information, deactivation information and disconnection information for each TN over a predetermined period of time, wherein the disconnection information comprises at least a current state of activation and a date on which the current state of activation was verified; and determine an actual status for each TN based on the analyzed carrier information, deactivation information and disconnection information, the determining comprising performing a disconnect analysis for each TN over the predetermined period of time to provide the current state of activation and the date on which the current state of activation was verified, and wherein the disconnect analysis comprises:

deriving a current state of activation for each TN over a sliding window of N days, wherein deriving the current state of activation for each TN over the sliding window of N days comprises locating messages that were successfully delivered or failed, wherein a failed message is indicated by a TN being invalid over the sliding window of N days; and periodically updating the derived current state of each TN.

12. The system of claim 11, wherein periodically updating comprises updating the derived current state of each TN every 24 hours.

13. The system of claim 11, wherein the current state of activation for each TN comprises one of Active, Unknown and Disconnected.

14. The system of claim 13, wherein a date the current state is verified comprises a date of a most recent observed successful message for an active state and a date of an oldest observed invalid message for a disconnect state.

15. The system of claim 11, wherein the carrier information comprises at least a voice provider, a message provider and a type of line associated with each of the TNs.

16. The system of claim 15, wherein the voice provider is a normalized name of a provider responsible for voice service and wherein a message provider is a normalized name of a provider responsible for messaging.

17. The system of claim 16, wherein the number intelligence module and at least one application programing interface obtains the carrier information from at least one of a Local Exchange Routing Guide (LERG), Number Portability Administration Center (NPAC), NetNumber Global Carrier Mapping Registry (GCMR) and a NetNumber Service Registry (NNSR).

18. The system of claim 11, wherein the deactivation information includes at least an entity that reported that deactivation, a date on which deactivation occurred and a type of deactivation.

19. The system of claim 18, wherein the type of deactivation comprises one of port, deactivation, reactivation and suspension.

20. The system of claim 19, wherein the number intelligence module and at least one application programing interface derive a deactivation type by cross referencing information from carrier intelligence and available deactivation files.

* * * * *